United States Patent
Parasnis et al.

(10) Patent No.: US 10,282,862 B2
(45) Date of Patent: May 7, 2019

(54) DIGITAL IMAGE GENERATION AND CAPTURE HINT DATA

(71) Applicant: Adobe Inc., San Jose, CA (US)

(72) Inventors: Abhay Vinayak Parasnis, Los Altos, CA (US); Oliver I. Goldman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/628,275

(22) Filed: Jun. 20, 2017

(65) Prior Publication Data

US 2018/0365856 A1    Dec. 20, 2018

(51) Int. Cl.
  *G06T 7/80* (2017.01)
  *G06T 7/62* (2017.01)
  *G06T 7/73* (2017.01)
  *G06F 17/30* (2006.01)

(52) U.S. Cl.
  CPC ............. *G06T 7/80* (2017.01); *G06T 7/62* (2017.01); *G06T 7/73* (2017.01); *G06F 17/3028* (2013.01)

(58) Field of Classification Search
  CPC .... G06T 7/80; G06T 7/62; G06T 7/73; G06T 17/3028
  USPC ........................................................ 345/469
  See application file for complete search history.

(56) References Cited

U.S. PATENT DOCUMENTS

| | | | |
|---|---|---|---|
| 9,323,325 B2* | 4/2016 | Perez ................. | G02B 27/017 |
| 9,405,432 B2* | 8/2016 | Vats ..................... | G06F 3/011 |
| 2008/0297589 A1* | 12/2008 | Kurtz .................. | H04N 7/147 |
| | | | 348/14.16 |
| 2015/0309316 A1* | 10/2015 | Osterhout ........... | G06F 3/012 |
| | | | 345/8 |
| 2016/0209648 A1* | 7/2016 | Haddick ........... | G02B 27/0093 |
| 2017/0053042 A1* | 2/2017 | Sugden .............. | G02B 27/0179 |
| 2017/0115742 A1* | 4/2017 | Xing ..................... | G06F 3/012 |
| 2017/0337737 A1* | 11/2017 | Edwards ............. | G06F 3/005 |
| 2018/0033200 A1* | 2/2018 | Ligameri ............ | G06F 3/04815 |
| 2018/0060700 A1* | 3/2018 | Bleyer ................ | G06K 9/6267 |
| 2018/0061034 A1* | 3/2018 | Zhao .................... | G06T 7/002 |
| 2018/0074329 A1* | 3/2018 | Kazansky .......... | G02B 27/0172 |

* cited by examiner

Primary Examiner — Javid A Amini
(74) Attorney, Agent, or Firm — Wolfe-SBMC

(57) ABSTRACT

Techniques and systems for digital image generation and capture hint data are described. In one example, a request is formed by an image capture device for capture hint data. The request describes a characteristic of an image scene that is to be a subject of a digital image. A communication is received via a network by the image capture device in response to the request. The communication includes capture hint data that is based at least in part of the characteristic. The capture hint data is displayed by a display device of the image capture device. The digital image of the image scene is then captured by the image capture device subsequent to the display of the capture hint data.

20 Claims, 9 Drawing Sheets

DIGITAL IMAGE GENERATION AND CAPTURE HINT DATA

BACKGROUND

Digital image generation has become an increasing part of a user's everyday life as a direct result of exposure to a wide range of devices that include this functionality. This includes exposure of the user to dedicated image capture devices as well as image capture devices incorporated as part of mobile phones, tablets, personal computers, and so forth.

Regardless of configuration, conventional digital image capture techniques rely on expertise of the user to capture visually pleasing images. A user, for instance, is confronted with a variety of tasks as part of initiating capture of a digital image by an image capture device. Examples of these tasks include selecting an image scene that is to be a subject of the digital image as well as how that digital image is to be captured, e.g., how to frame an object in the image scene, how to address lighting conditions, an angle at which to address the object, and so forth. While this gives a sophisticated user a variety of creative opportunities, a user that does not have these expertise is confronted with significant challenges. As a result, these conventional techniques may be frustrating to the user and result in lower quality images being taken due to the user's inability to take advantage of the sophisticated options.

SUMMARY

Techniques and systems are described for generation of a hint from hint data to guide capture of a subsequent digital image, e.g., as a single digital image or part of video. The hint, for instance, may be generated from capture hint data to guide a user prior to capture of a digital image to increase a likelihood that the digital image, when captured by an image capture device, is visually pleasing. As a result, the hint and capture hint data may be used to increase a user's efficiency as part of interaction with the image capture device to capture visually pleasing digital images by guiding a user in how to capture these images.

Capture hint data, and corresponding hints generated from the capture hint data, may take a variety of forms. The capture hint data, for instance, may describe a time, location, composition, and/or orientation to be used to capture a digital image by the image capture device. In one example, the capture hint data is generated as a result of machine learning models that are trained based on training digital images that have been determined to be visually pleasing. The capture hint data, for instance, may be generated to describe characteristics that are learned from the training digital images, e.g., the time, location, orientation, composition, and so on associated with each training digital image. Therefore, the capture hint data may be used to generate a hint to guide a user to leverage these times, locations, orientations, compositions, and so on learned from the training digital images prior to capture a subsequent digital image.

The hint generated from the capture hint data may be output to the user in a variety of ways, e.g., visually, haptically, aurally. The hint, for instance, may be output by a display device of the image capture device concurrently with a real time preview image of an image scene that is captured by the image capture device. In this way, a user may view the hint along with the image scene to be guided as to how to capture the digital image, e.g., move to a location, different orientation, time at which to capture the image, and so forth. Other instances are also contemplated, such as to display the hint on a display device associated with the image capture device, e.g., a wearable computing device, mobile phone, and so forth. As a result, a user's experience and efficiency as part of interaction with the image capture device may be increased.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
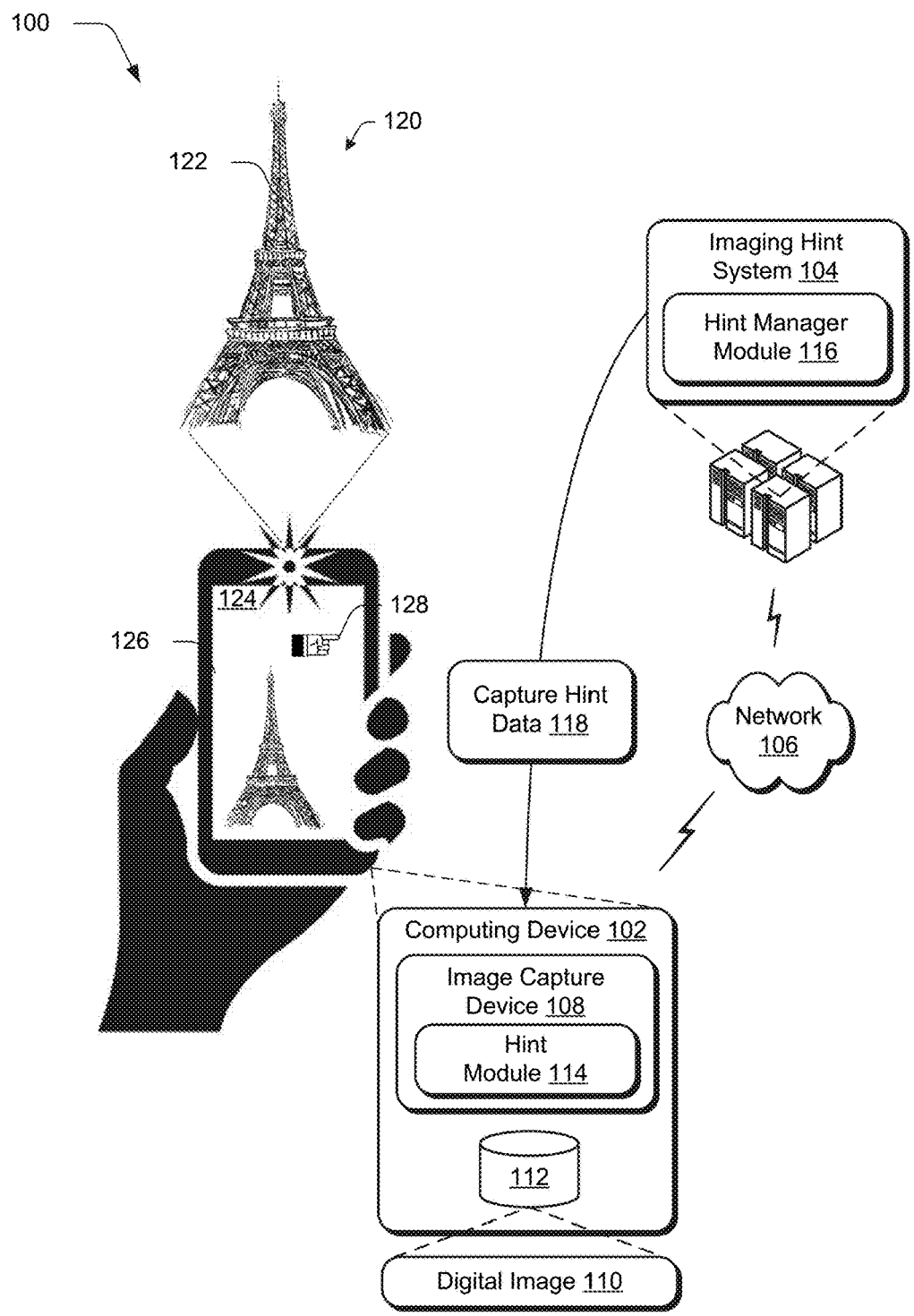
FIG. 1 is an illustration of an environment in an example implementation that is operable to employ capture hint data techniques described herein.

Over a billion digital images are captured by users of image capture devices every day. Conventional techniques to capture digital images, however, rely primarily on a user's expertise in order to capture digital images that are visually pleasing. Therefore, conventional techniques require the user to gain these expertise or obtain less than desirable results, which is frustrating, time intensive, and computationally inefficient.

Accordingly, digital image generation and capture hint data techniques and systems are described. In examples described in the following, capture hint data is used to generate a hint for output in a user interface to guide a user as to "how" to capture a subsequent digital image by an image capture device. The hint, for instance, may describe an action to be taken as part of capturing the digital image. This hint may thus guide a user as to how to maximize a likelihood that a subsequent digital image captured by the user is visually pleasing.

The hint and corresponding capture hint data may take a variety of forms. In one example, the hint describes a location at which to capture a digital image of an image scene. A user that wishes to capture a digital image of a national monument, for instance, may be guided through display of a hint by an image capture device (e.g., viewfinder and/or rear-display device) as to where the user should move to capture the image as well as a composition, e.g., particular objects, other users that are in proximity (e.g., family members), and so forth. The hint may also describe an optimal orientation to be used by the image capture device, e.g., portrait or landscape. In another example, the hint may describe an optimal time of day to capture an image, e.g., for best lighting as further described in relation to FIG. 5. Other examples are also contemplated, such as a hint regarding settings to be used to capture the digital image by the image capture device, e.g., to take into account material composition, objects included in the image scene, and so forth.

Generation of the capture hint data may be performed in a variety of ways. In one example, training digital images are located that are visually pleasing, e.g., through manual identification or machine learning. The training digital images, for instance, may be obtained from a content sharing system (e.g., stock image system), a content creation system, and so forth. The training digital images, and associated metadata, may then be used to generate capture hint data that describes "how" those training digital images of a particular image scene are captured and/or edited. The capture hint data, for instance, may describe a location from which the training digital images are captured, filters and settings used to capture the image, orientation of the image capture device when doing so, and so forth that is learned from the associated metadata.

The image capture device may then leverage this capture hint data to generate and display a hint in the user interface that describes an action that is to be performed as part of capturing the subsequent digital image. The image capture device, for instance, may include a hint module that is configured to form a request for capture hint data from an imaging hint system that is accessible via a network, e.g., the Internet. The request specifies a characteristic of an imaging scene that is to be subject of a digital image. The imaging hint system then selects capture hint data that corresponds to the characteristic and communicates this data back to the image capture device, e.g., geographic location, identified object, and so forth. In another example, the capture hint data is maintained locally on the image capture device.

The image capture device then uses the capture hint data in order to generate a hint for display in a user interface associated with the image capture device. The image capture device, for example, may include a display device configured as a viewfinder, rear display device of a dedicated camera, on a screen of a mobile phone, and so forth. The hint may be displayed concurrently with a preview of the digital image, i.e., a preview image. The hint may be displayed on the display device or on an associated peripheral of the user, such as a wearable device, mobile phone, and so on. The hint may thus guide a user and provide feedback in real time to capture the digital image of the image scene through use of the hint and the preview image together, such as to indicate "where to move" in order to capture the digital image.

In one example, the hint module is included as part of a pre-capture system of the image capture device. The pre-capture system is configured to obtain capture hint data to guide user interaction with the image capture device before the digital image is captured. As a result, the capture hint data is provided "upstream" of a digital image processor used to generate the digital image that is to be stored by the device.

The image capture device, for instance, may include an "image pipeline" that includes components to focus light (e.g., a lens and aperture), convert the light into an analog signal (e.g., an image sensor), convert the analog signal into a digital signal as raw image data (e.g., an analog/digital converter), and then generate a digital image that is configured for rendering through use of a digital image processor. The hint module may thus display the hint along with a preview image on a preview display device, e.g., a viewfinder, display device of a mobile phone, to guide the user to perform an action. The hint, for instance, may specify movement to a particular location. The user, and image capture device, may then perform an action (e.g., move to a location) to generate the actual digital image (provide a capture input) that is stored in storage of the image capture device. In this way, the hint and capture hint data may be used to guide generation of a subsequent digital image. Further discussion of these and other examples is included in the following sections and shown in corresponding figures.

In the following discussion, an example environment is first described that may employ the capture hint data techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ capture hint data techniques described herein. The illustrated environment 100 includes a computing device 102 and an imaging hint system 104 that are communicatively coupled, one to another, via a network 106, e.g., the Internet. Computing devices that implement the computing device 102 and imaging hint system 104 may be configured in a variety of ways.

A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as illustrated for the imaging hint system 104 and as further described in relation to FIG. 9.

The digital medium environment 100 is further illustrated as including an image capture device 108, as part of the computing device 102, that is configured to generate a digital image 110. The digital image 110 is illustrated as stored in storage 112, e.g., a computer-readable storage medium, database, and so forth. Other examples are also contemplated, such as implementation of the image capture device 108 as a standalone device, i.e., a dedicated digital camera.

The image capture device 108 includes a hint module 114. The hint module 114 is representative of functionality implemented at least partially in hardware of the image capture device 108 to generate a hint 128 usable to guide a user in capturing the digital image 110. In the illustrated example, the hint module 114 is configured to communicate with a hint manager module 116 of the imaging hint system 104. The hint manager module 116 is configured to provide capture hint data 118 based at least in part on a characteristic of an image scene 120 that is to be a subject of the digital image 110. Although illustrated as implemented remotely via the network 106, functionality of the imaging hint system 104 and hint manager module 116 may also be implemented in whole or in part locally by the image capture device 108.

In the illustrated example, the image capture device 108 is used to capture a digital image 110 of an image scene 120 that includes the Eiffel tower 122. A preview image 124 is displayed within a user interface on a display device 126 associated with the image capture device 108 that is used by a user to align how the digital image 110 is to be captured of the image scene 120.

The image capture device 108 also obtains capture hint data 118 from the imaging hint system 104, and from this data, generates a hint 128 for display by the display device 126. Other examples are also contemplated, including aural or haptic feedback. The hint 128 in this example is configured to guide the user as to a best location at which to capture the digital image 110 of the image scene 120, e.g., to "move to the right." In this way, the hint 128 generated from the capture hint data 118 may expand a user's insight into how to best capture a visually pleasing digital image 110 and thus improve operational efficiency of the image capture device 108 to capture visually pleasing images. Further, computational, memory, and battery resources of the image capture device 108 may be conserved. The hint module 114 may be implemented in a variety of ways, an example of which is configured as part of a pre-capture system which is described in the following discussion and shown in a corresponding figure.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
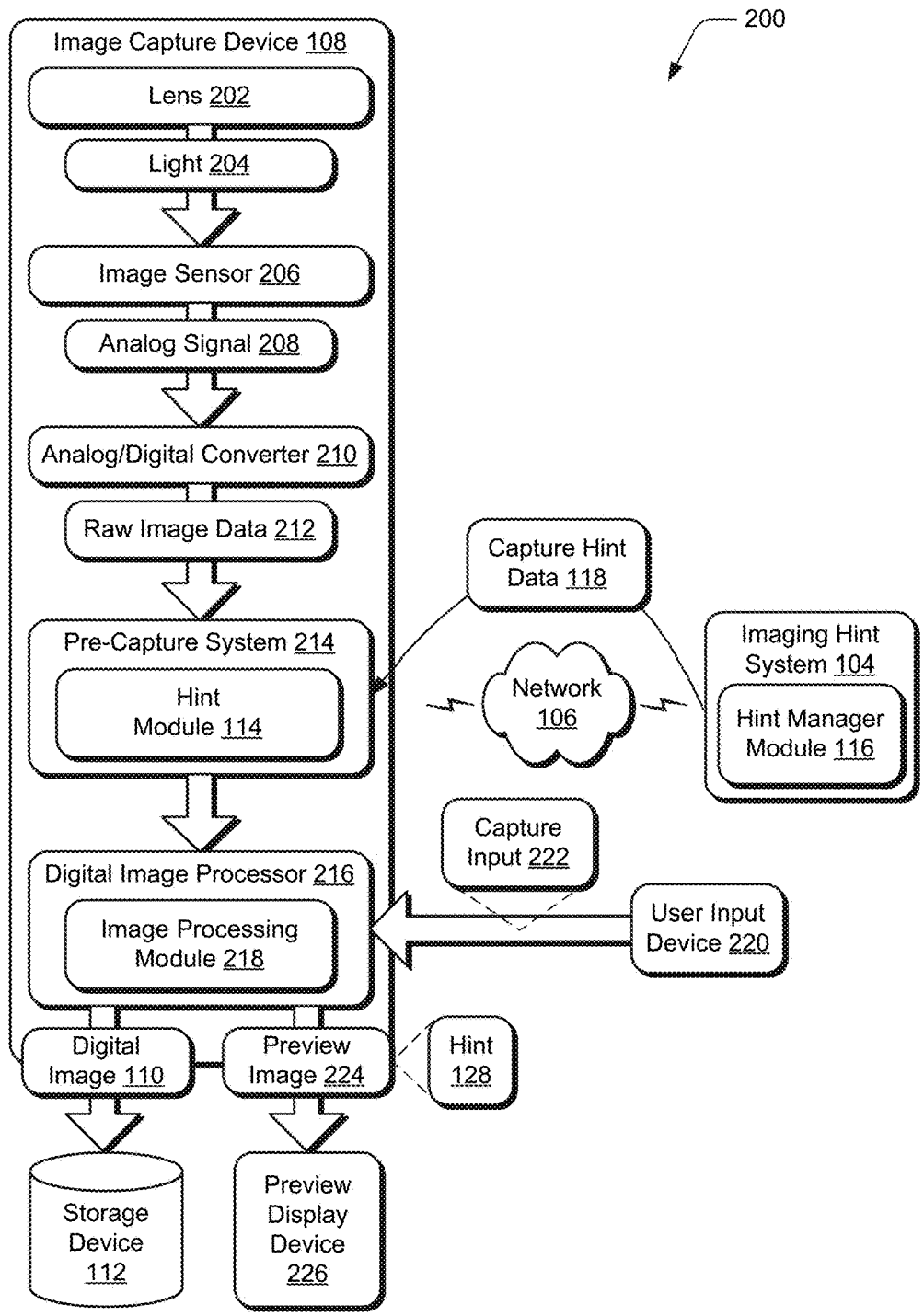
FIG. 2 depicts an example system showing an image processing pipeline of the image capture device of FIG. 1 in greater detail as including a pre-capture system.

FIG. 2 depicts an example system 200 showing an image processing pipeline of the image capture device 108 in greater detail as including the hint module 114 as part of a pre-capture system. The image processing pipeline begins with at least one lens 202 (e.g., and associated variable diaphragm) that is used to focus light 204 onto an image sensor 206. In one example, the image capture device 108 includes dual lenses 202 and image sensors 206, such as to support different focal lengths, parallax, and so forth. The image sensor 206 is configured to generate an analog signal 208 responsive to exposure to light 204, e.g., as a CCD or CMOS sensor. This analog signal 208 is then converted by an analog/digital converter 210 into raw image data 212, e.g., from a single image sensor 206 or multiple image sensors as part of a dual-lens system.

Raw image data 212 is a camera file format that contains minimally processed data from the image sensor 206. The raw image data 212, for instance, is not yet processed and thus is not configured for rendering, e.g., for display, printing, and/or editing with a bitmap graphics editor. Thus, raw image data 212 is also considered a "digital negative" in that the negative is not directly usable as a digital image, but has the information used to create the digital image.

The raw image data 212, for instance, may have a wider dynamic range or color gamut than a format used by the digital image 110 generated from this data. This is a result of capture by the raw image data 212 of radiometric characteristics of the image scene 120, i.e., physical information about light intensity and color of the image scene 120. As part of this, the raw image data 212 may store information accordingly to a geometry of photo-receptive elements of the image sensor 206 rather than as points (e.g., pixels) in the resulting digital image 110.

The raw image data 212 is illustrated in this example as being provided to the pre-capture system 214. The pre-capture system 214 includes the hint module 114 of FIG. 1. The hint module 114 is representative of functionality implemented at least partially in hardware (e.g., an integrated circuit and memory) to obtain capture hint data 118 from a hint manager module 116 of an imaging hint system 104 via a network 106 and generate a hint 128 from this data.

The hint module 114, for instance, may form a request that is communicated to the imaging hint system 104 that describes a characteristic associated with an image scene 120 that is a subject of the digital image 110, e.g., location, identified object, and so forth. In response, the hint manager module 116 of the imaging hint system 104 locates capture hint data 118 that corresponds to this characteristic. The request, for instance, may be based on the raw image data 212 itself, characteristics of a geographic location at which the image capture device 108 is disposed (e.g., objects and/or other users within the environment as part of composition), orientation of the image capture device 108, and so forth. Thus, the capture hint data 118 may also take a variety of forms as further described below.

The raw image data 212 and the capture hint data 118 are then provided to a digital image processor 216, e.g., a digital signal processor, microcontroller, CPU of the image capture device 108, and so forth. The digital image processor 216 includes an image processing module 218 that is representative of functionality to generate the digital image 110 from the raw image data 212, which is illustrated as output for storage by a storage device 112. The digital image 110 is generated by the digital image processor 216 to be in a form ready for rendering, e.g., as a JPEG, TIFF, and so forth.

The image capture device 108 also includes a user input device 220 that is selectable by a user to provide a capture input 222 to initiate (e.g., trigger) generation of the digital image 110, e.g., through use of a physical button, touchscreen functionality of a display device, and so forth. The user, for instance, may view a preview image 224 on a preview display device 226 of the image capture device 108, e.g., viewfinder, display device disposed on a back of a dedicated image capture device, the display device 126 of a computing device 102, and so forth. The preview image 224 serves as a real time output resulting from light 204 capture and processing as performed by the image capture device 108. Upon receipt of the capture input 222, current raw image data 212 received by the digital image processor 216 is used to generate the digital image 110 for storage in a storage device 112 of the image capture device 108. In this way, a user may initiate capture and storage of a digital image 110 when desired.

As part of this, the pre-capture system 214 obtains capture hint data 118 to guide generation of the digital image 110 through output of a hint 128, e.g., simultaneously with the preview image 224. The capture hint data 118, for instance, may direct the user to undertake an action before capture of the digital image 110. In this way, the capture hint data 118 is used as part of "pre-capture" of the subsequent digital image 110 by the image capture device 108.

In one example, the pre-capture system 214 is configured to form a request for capture hint data 118 and obtain the capture hint data 118 before receipt of an input from a user to initiate the capture and generation of the digital image 110, e.g., before "pressing a button" of the user input device 220. The pre-capture system 214, for instance, may collect data describing characteristics of a physical environment, in which, the image capture device 108 is disposed (e.g., a geographic location, amount of light, others users to aid composition, etc.), collect raw image data 212 that describes objects included in the physical environment that is not yet rendered by the image capture device 108, and so forth. This collected data may then be provided to the imaging hint system 104 as a basis to locate capture hint data 118 that corresponding to an image scene 120 that is a subject of the digital image 110 capture. As a result, temporal and computational efficiency of the image capture device 108 is increased that may support real time generation and output of the hint 128 from the capture hint data 118 even with communication via the network 106.

The hint 128 and corresponding capture hint data 118 may be configured in a variety of ways to guide a user to perform an action before generation of a subsequent digital image 110. In one example, the hint 128 is configured to guide a user to a particular geographic location, from which, the digital image 110 is to be captured as further described in relation to FIG. 3. The hint 128, for instance, may be used to guide a user to a location at which to capture a digital image as well as "what" to capture by the digital image, e.g., other family members as part of composition. In another example, the hint 128 is configured to guide an orientation to be used by the image capture device 108 to capture the digital image 110 as further described in relation to FIG. 4. In a further example, the hint 128 is configured to guide collaboration between multiple image capture devices 108 as further described in relation to FIG. 5.

Figure 3:
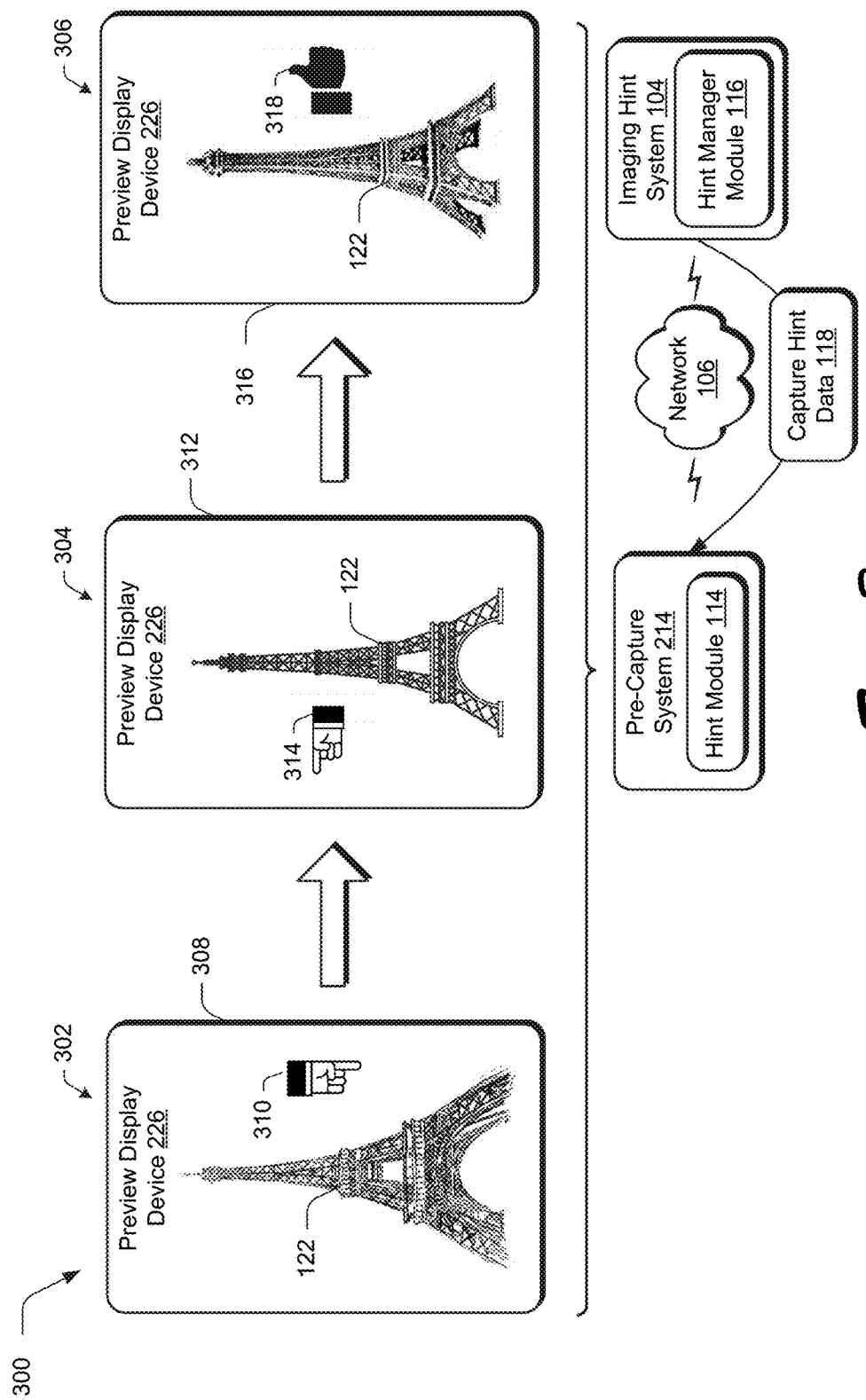
FIG. 3 depicts an example implementation in which a hint is output concurrently with a preview image of an image scene to guide movement of the image capture device of FIG. 1 to a geographic location at which to capture a digital image.

FIG. 3 depicts an example implementation 300 in which a hint 128 is output concurrently with a preview image 224 of an image scene to guide movement of the image capture device 108 to a geographic location at which to capture a digital image 110. This implementation is illustrated using first, second, and third stages 302, 304, 306.

At the first stage 302, a preview display device 226 associated with the image capture device 108 is used to display a preview image 308 of the Eiffel Tower 122. A hint module 114 obtains capture hint data 118 that correspond to a characteristic of the image scene that is a subject of the capture. The characteristic, for instance, may specify a geographic location (e.g., through use of a positioning device), identify an object included in the image scene (e.g., the Eiffel Tower 122, and/or other family members), and so forth.

The capture hint data 118 in this instance is thus used to generate a hint 310 that is output (e.g., displayed by the preview display device 226) to guide a user to a particular geographic location at which to capture the digital image 110. In the illustrated example at the first stage 302, the hint 310 generated from the capture hint data 118 indicates that the image capture device 108 is too close to the Eiffel Tower 122 and thus the user and image capture device 108 are to "back away" from the tower.

At the second stage 312, the user and image capture device 108 have backed away a sufficient distance, but the Eiffel Tower 122 as viewed from that location lacks a desired perspective. Accordingly, capture hint data 118 is obtained by the hint module 114 from the imaging hint system 104 to generate the hint 314 to move to a geographic location at which an improved perspective of the Eiffel Tower 122 may be achieved.

Once at that location as shown at the third stage 306, the hint 318 is output by the hint module 114 indicating the performance of the desired action has been achieved, e.g., movement to the "correct" geographic location. The hint 318 may thus prompt the user to initiate generation of the digital image 110, e.g., through use of the user input device 220. In another example, the hint module 114 causes capture of the digital image 110 automatically and without further user intervention upon performance of the action. The image capture device 108, for instance, may automatically generate the digital image 110 once at the particular location and with a desired view of the Eiffel Tower 122. This may also be used to guide composition through use of the hint 318, e.g., through detection of associated users (e.g., family member) that are proximal to the image capture device 108.

Figure 4:
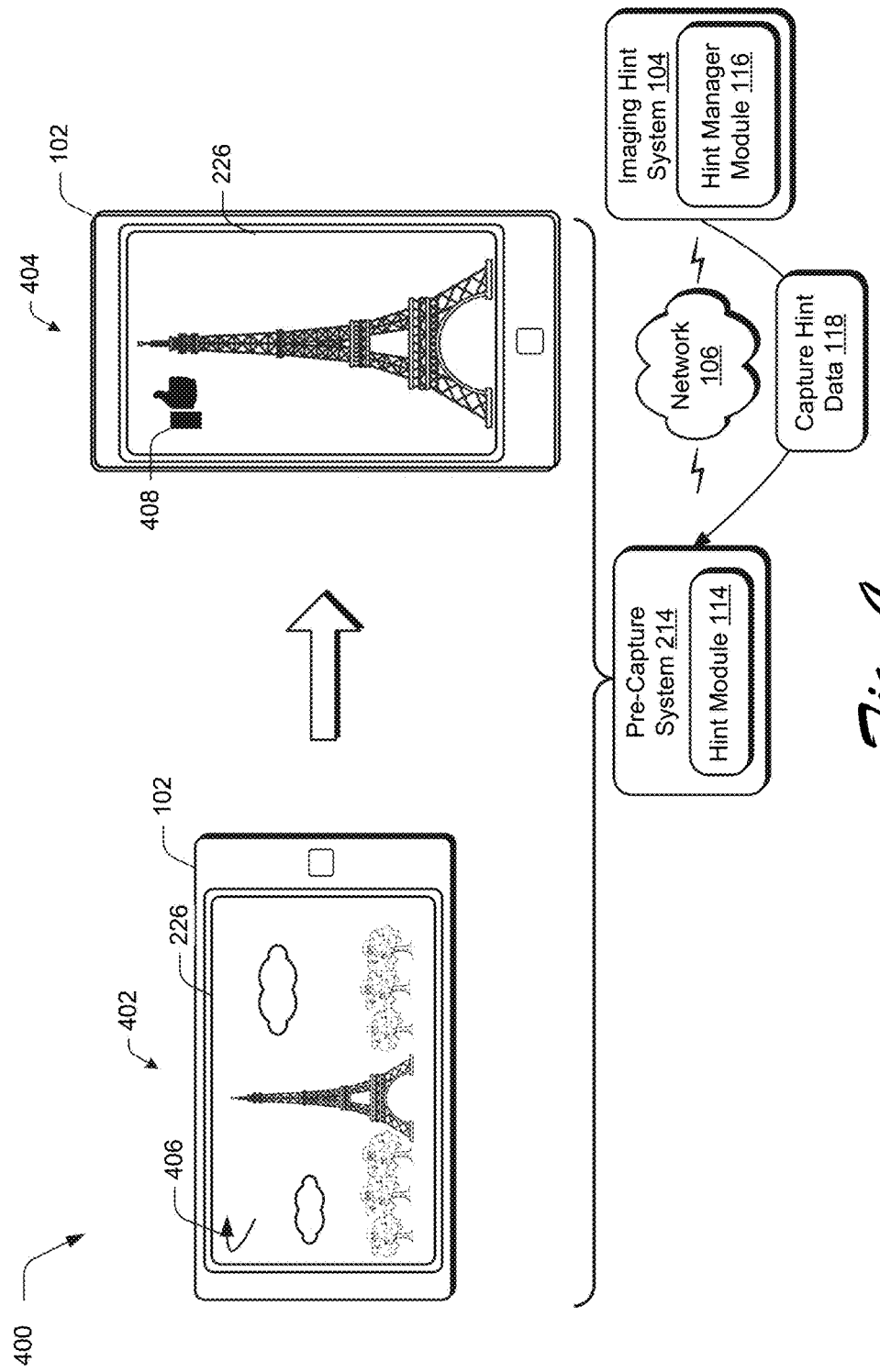
FIG. 4 depicts an example implementation in which a hint is output concurrently with a preview image of an image scene to guide an orientation of the image capture device of FIG. 1 to be used to capture a digital image.

FIG. 4 depicts an example implementation 400 in which a hint 128 is output concurrently with a preview image 224 of an image scene to guide an orientation of the image capture device 108 to be used to capture a digital image 110. This implementation is illustrated using first and second stages 402, 404. An image capture device 108 may be used to generate digital images in a variety of orientations based on a corresponding orientation of the device. An example of this is a landscape orientation as shown at the first stage 402 and a portrait orientation as shown at the second stage 404 as defined by an aspect ratio of a resulting digital image 110.

In this example, the capture hint data 118 is configured to generate hints 406, 408 to indicate which orientation to use to capture the digital image 110. At the first stage 402, for instance, the hint 406 is configured to indicate to the user to change from a landscape orientation to a portrait orientation. The hint 408 at the second stage 404 indicates that performance of the indicated action has been completed, e.g., as a "thumbs up." Thus, the hints 406, 408 are configured to both suggest an action and indicate successful performance of the action in this example, thereby providing a readily understood user feedback mechanism.

Figure 5:
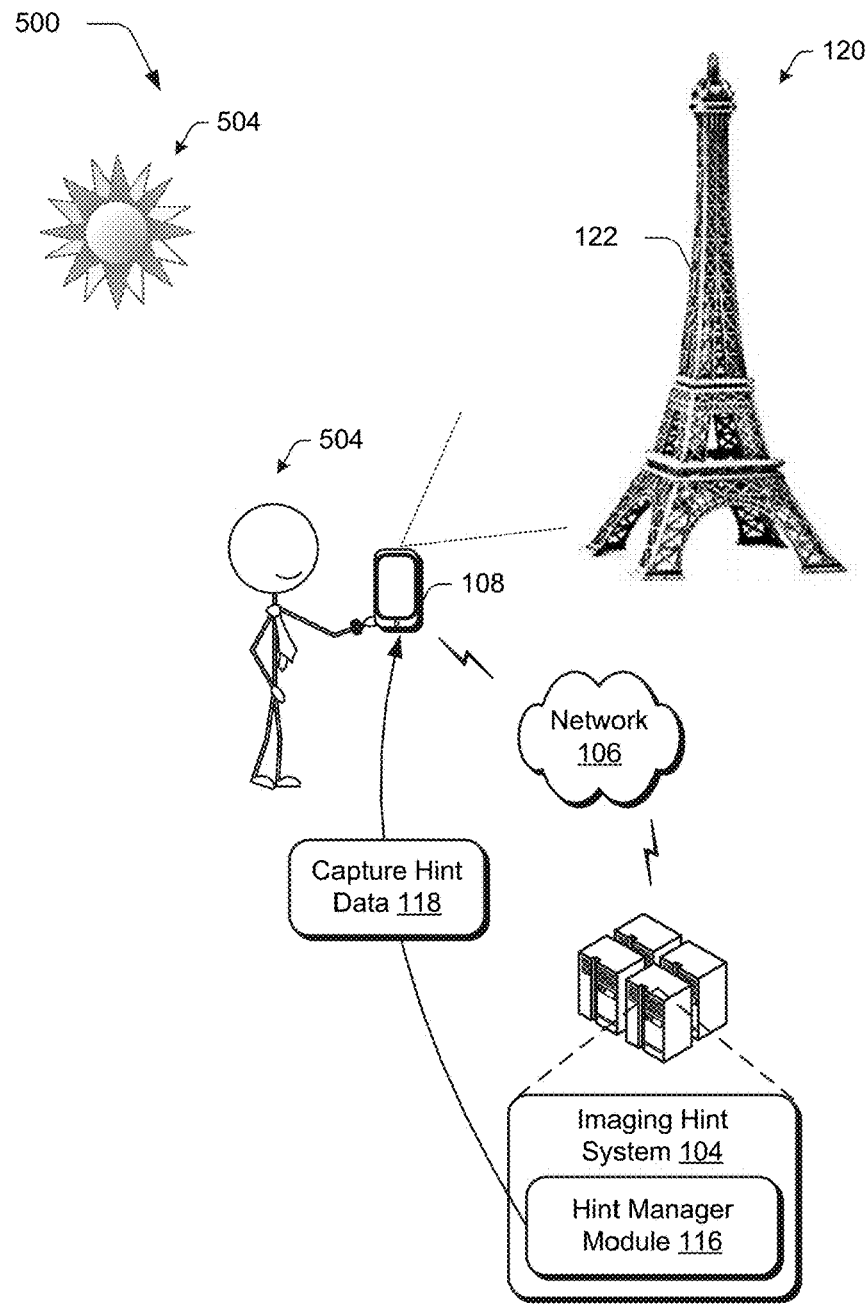
FIG. 5 depicts an example implementation in which capture hint data is used to guide a time at which to generate a digital image.

FIG. 5 depicts an example implementation 500 in which capture hint data is used to guide a user as to an orientation and/or time of day to capture a digital image. Different lighting conditions caused by the passage of the sun 502 at different times of day may have an effect on the capture of a digital image. Consequently, capture hint data 118 may also be used to generate a hint that is usable to describe an optimal location for a particular time of day or a particular time of day for a location. In the illustrated example, shadows caused by a relationship of a user 504 and associated image capture device 108 to the Eiffel Tower 122 may result in a hint that specifies a new location to move or a hint that indicates a time at which to capture the digital image. Thus, hint and corresponding capture hint data used to generate the hints may be configured in a variety of ways. An example of generation of the capture hint data is discussed in the following and shown in corresponding figures.

Figure 6:
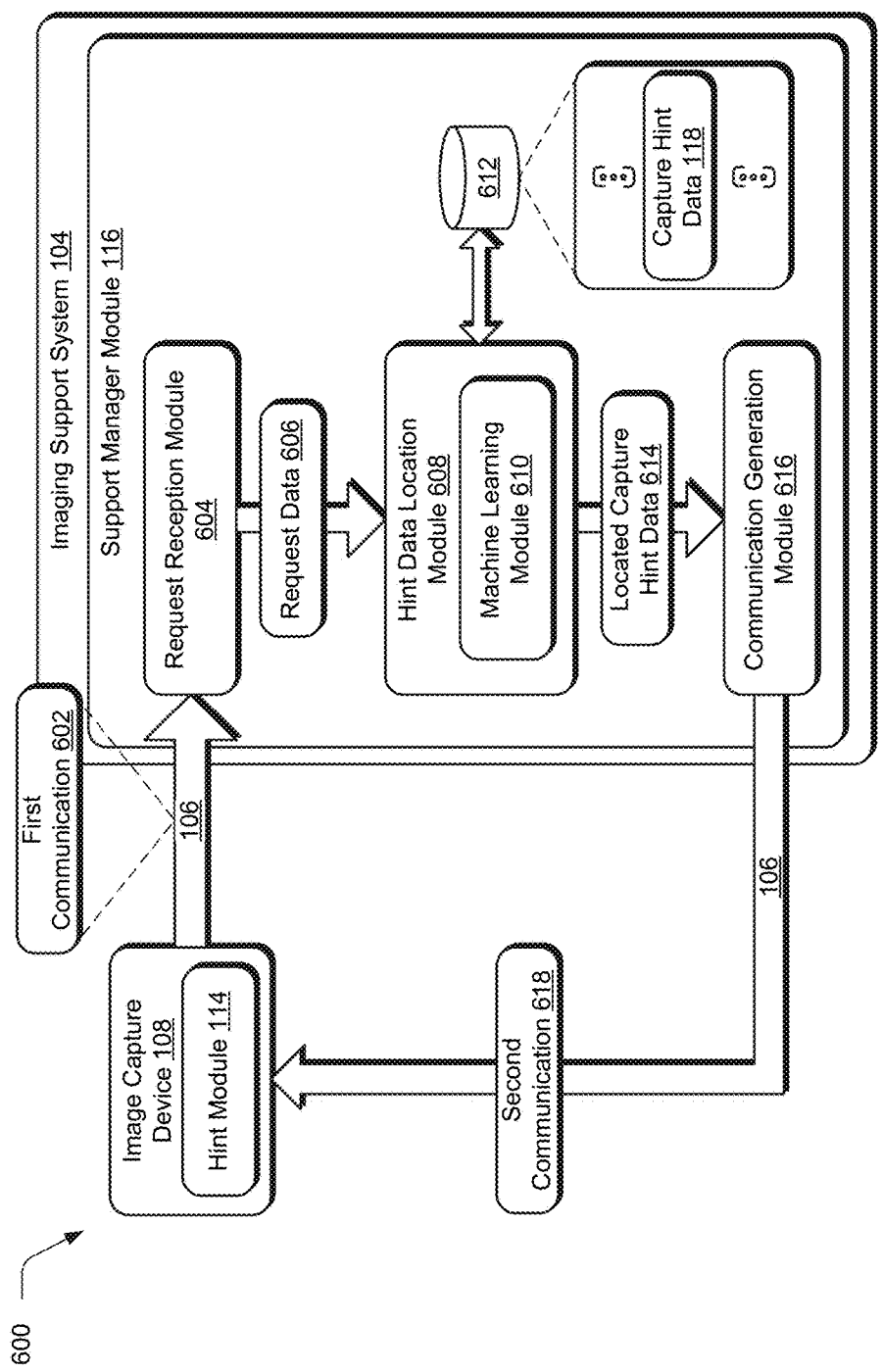
FIG. 6 depicts an example implementation in which capture hint data is obtained by the pre-capture system of the image capture device of FIG. 2 via a network.

FIG. 6 depicts an example implementation 600 in which capture hint data 118 is obtained by a hint module 114 of the image capture device 108 via a network 106. Other examples are also contemplated, such as to obtained from storage local to the image capture device 108.

To begin, the hint module 114 forms a first communication 602 that is communicated over the network 106 to the hint manager module 116 of the imaging hint system 104. A request reception module 604, implemented at least partially in hardware of a computing device, receives this first communication 602 and from it extracts request data 606 that describes a characteristic associated with an image scene that is to be captured by the digital image 110. The request data 606 may be configured to request a variety of different types of capture hint data 118.

The request data 606, for instance, may specify characteristics of a physical environment, in which, the image capture device 108 is disposed. This may include a geographic location obtained through use of a global positioning system, cell tower triangulation, Wi-Fi access, and so on. Other characteristics of a physical environment include lighting conditions, time-of-day, calendar day, direction at which the image capture device 108 "is facing" (e.g., through use of a compass), altitude, objects (e.g., other users) disposed in the physical environment, and so forth. The request data 606 may also be based on the raw image data 212 itself, e.g., include a down-sampled version of the raw image data, identify objects or materials in the image scene 120, and so forth. Other examples are also contemplated, such as to include all or a portion of a preview image 224, use of other sensors including radar sensors, and so forth.

The request data 606 is then employed by a hint data location module 608 (e.g., and corresponding machine learning module 610) to locate capture hint data 118, which is illustrated as included in a storage device 612. The machine learning module 610, for instance, may employ a model that is generated to support the different types of requests and corresponding capture hint data 118.

Figure 7:
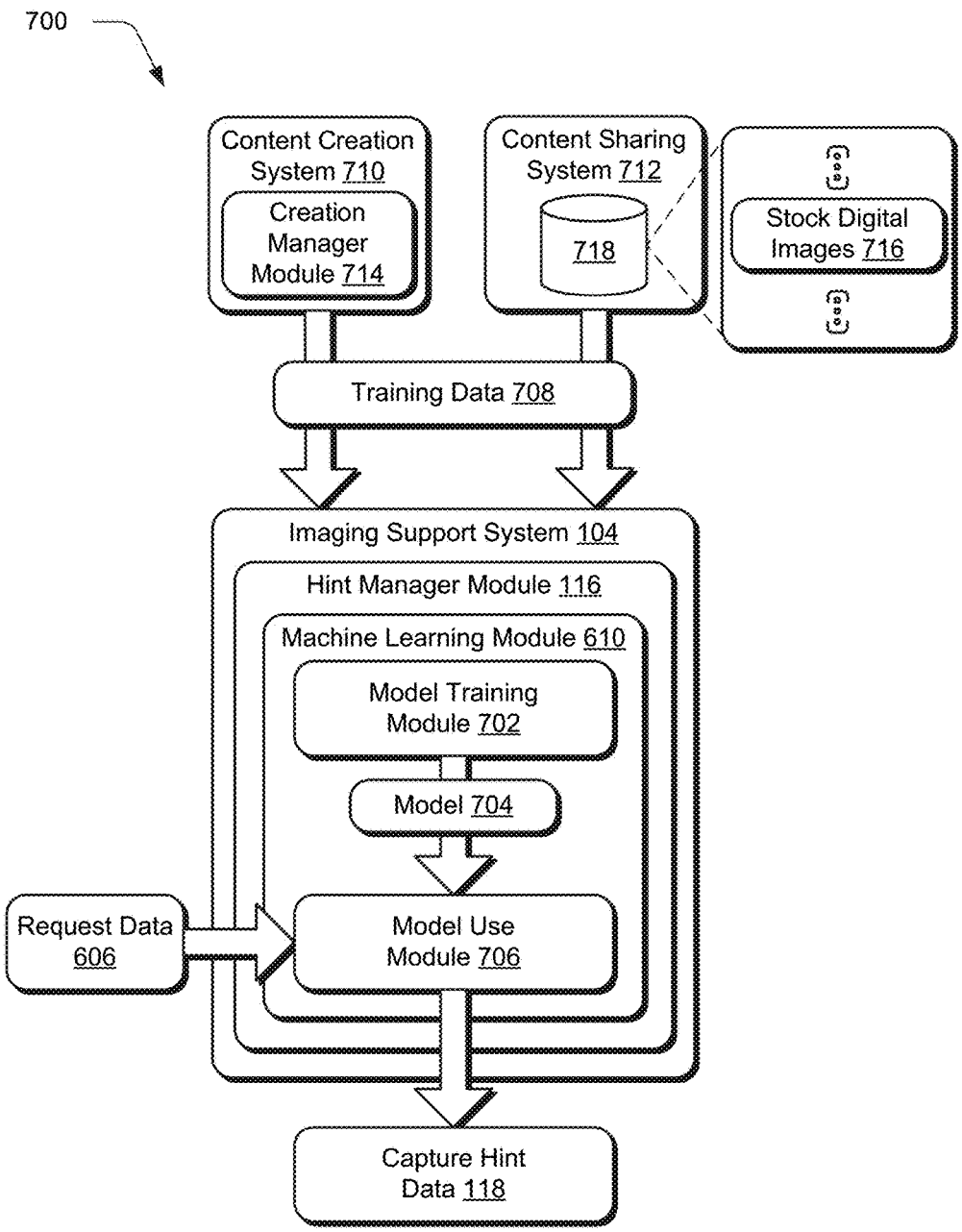
FIG. 7 depicts an example implementation in which capture hint data is generated by the imaging hint system of FIG. 4 using machine learning.

As shown in an example system 700 of FIG. 7, for instance, the machine learning module 610 includes a model training module 702 configured to generate a model 704 using machine learning, e.g., through use of a neural network. The machine learning module 610 also includes a model use module 706 that is configured to use the model 704 to locate capture hint data 118 as corresponding to the request data 606 extracted from the first communication 602, i.e., the characteristic.

The model training module 702 may train the model 704 in a variety of ways. In the illustrated example, the model training module 702 receives training data 708 from a content creation system 710 and/or a content sharing system 712. The training data 708 includes training digital images that are determined to be "visually pleasing" and associated metadata describing characteristics associated with the training digital images. The training digital images, for instance, may be manually located (e.g., through user interaction) or automatically located through use of machine learning, e.g., a classifier trained based on image aesthetics. Metadata associated with the training digital images describes corresponding characteristics of the training digital images, such as where and how captured. Accordingly, the training data 708 describes the characteristics associated with visually pleasing digital images. Further, this may be used to train on digital images that have been identified by the user that are visually pleasing, e.g., a database of user images to learn a distinctive style of the user.

The model training module 702, through use of machine learning (e.g., a neural network) then trains a model 704 based on the training data 708, e.g., training digital images and metadata describing the characteristics. The model 704 may then be employed by the model use module 706 to locate capture hint data 118 that corresponds with a characteristics specified as part of the request data 606 of FIG. 6. The request data 606, for instance, may specify a characteristic associated with an image scene (e.g., location, object, and so forth) and the model use module 706 may locate capture hint data 118 that corresponds to the characteristic. The capture hint data 118, for example, may specify a geographic location that is a basis of "visually pleasing" training digital images of the Eiffel Tower 122, device orientation, and so forth.

Returning again to FIG. 6, the located capture hint data 614 is provided from the hint data location module 608 to a communication generation module 616. The communication generation module 616 is configured to form and transmit a second communication 618 via the network 106 to the hint module 114 for use by the image capture device 108, e.g., to guide capture of a subsequent digital image 110. In this way, functionality of the image capture device 108 may be expanded even before the digital image 110 is generated into a form configured for rendering.

Example Procedure

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-7.

Figure 8:
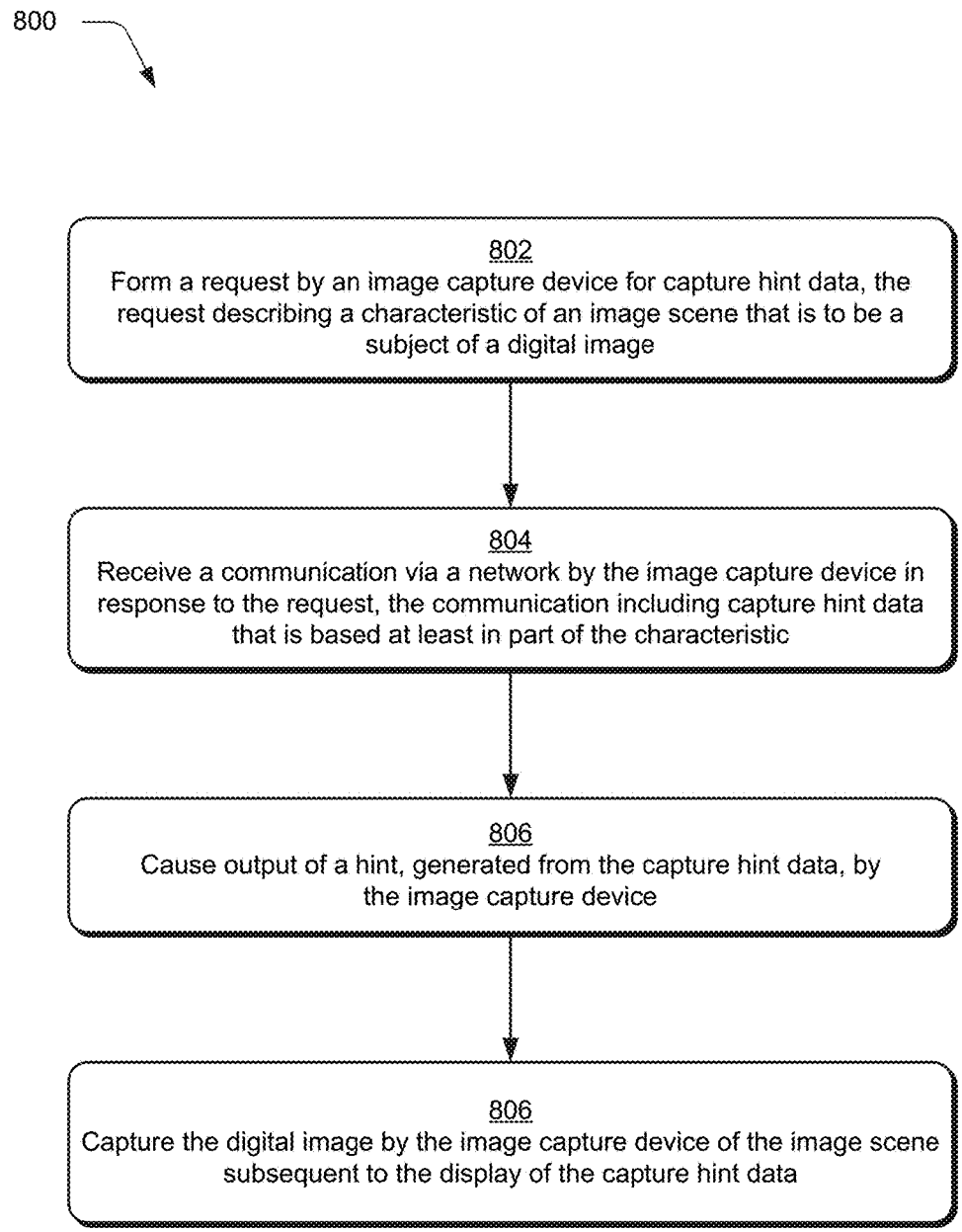
FIG. 8 is a flow diagram depicting a procedure in an example implementation in which capture hint data is used to generate a hint for output by an image capture device.

FIG. 8 depicts a procedure 800 in an example implementation in capture hint data is used to generate a hint for output by an image capture device. A request is formed by an image capture device for capture hint data. The request describes a characteristic of an image scene that is to be a subject of a digital image (block 802). The characteristic, for instance, may describe a geographical location, lighting conditions, object included in an image scene (e.g., the Eiffel Tower 122), time-of-day, weather conditions, and so forth. Accordingly, the hint module 114 of the computing device 102 may detect this characteristic and in response form the communication. As described in relation to FIG. 2, this may be performed as part of a pre-capture system 214 such that the request may be generated even before a user removes a phone from a pocket, activates the image capture device 108 (e.g., based on a GPS coordinate from a position determining system), and so forth.

A communication is received via a network by the image capture device in response to the request. The communication includes capture hint data that is based at least in part of the characteristic (block 804). The communication, for instance, may be received from the imaging hint system 104 via a network 106. The capture hint data, as described in relation to FIG. 7 may be generated using machine learning, e.g., by a neural network, to describe characteristics of "visually pleasing" training digital images. Thus, the capture hint data may take a variety of forms, such as specifying a particular location at which to capture a digital image, a point-of-view to be employed, orientation of the image capture device (e.g., in three-dimensional space), and so forth.

A hint, generated from the capture hint data, is caused to be output by the image capture device (block 806), e.g., displayed in a user interface of a display device, aurally via a speaker, haptic output, and so forth. This hint 128, for instance, may guide a user as to where to stand and point the image capture device, may support when and where to capture a digital image as described in relation to FIG. 5, and so forth. In another example, the image capture device causes output of the hint 128 on another device associated with the user, e.g., a mobile phone, tablet, and so forth. The image capture device, for instance, may prompt a user to "take a picture here" or "try here in two weeks for a full moon" via output of a hint 128 on a mobile phone. In this way, the image capture device may leverage other devices of the user toward use of the image capture device.

The digital image of the image scene is then captured by the image capture device subsequent to the display of the capture hint data (block 808). This may be initiated manually by a user, e.g., as a capture input 222 received from a user input device 220. This may also be initiated automatically and without user intervention by the hint module 114, e.g., when a preview image 224 is generated that indicates that the characteristic of the image scene has been met. The image capture device 108, for instance, may be moved to a particular geographic location and pointed to capture a particular field-of-view of the image scene 120. Thus, the action to be taken as specified by the hint 128, when met, may cause the hint module 114 to initiate generation of the digital image 110. A variety of other examples are also contemplated.

Example System and Device

Figure 9:
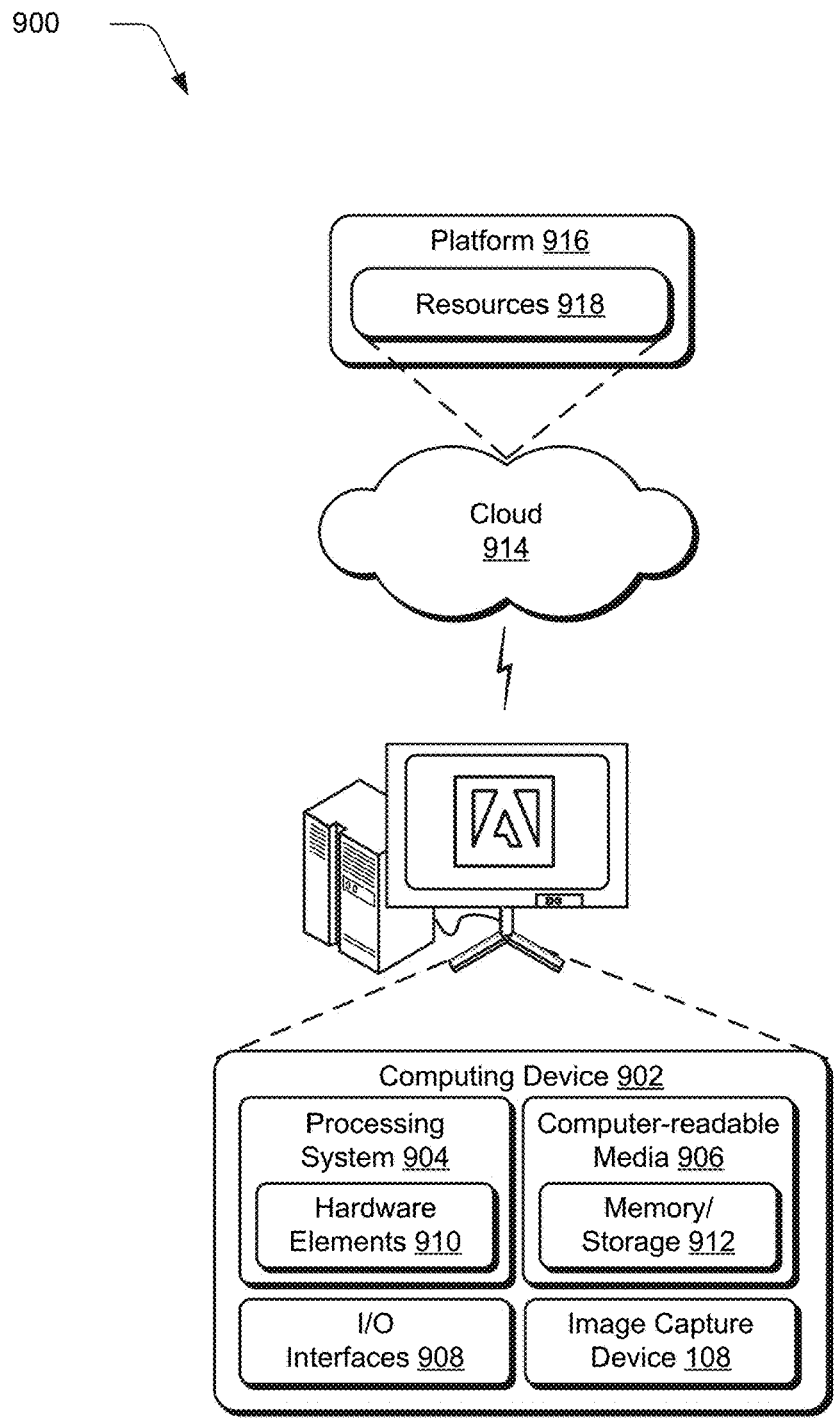
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the image capture device 108. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by an image capture device, the method comprising:
    forming a request by the image capture device for capture hint data, the request describing a characteristic of an image scene that is to be a subject of a digital image, the characteristic including a geographic location, a time, or a composition of one or more objects to capture the digital image;
    receiving a communication via a network by the image capture device in response to the request, the communication including capture hint data that is based at least in part of the characteristic;
    displaying, by the image capture device, a hint generated from the capture hint data, the hint indicating how the digital image is to be captured using the image capture device based at least in part on the characteristic; and
    capturing the digital image by the image capture device of the image scene subsequent to the displaying of the capture hint data.

2. The method as described in claim 1, wherein the capture hint data describes another geographical location, at which, to capture the digital image of the image scene.

3. The method as described in claim 1, wherein the characteristic described by the request is a physical orientation of the image capture device and the capture hint data is based at least in part on the physical orientation.

4. The method as described in claim 3, wherein the physical orientation identifies:
    a direction, toward which, the image capture device is pointed to view the image scene; or
    an orientation of the image capture device in three-dimensional space.

5. The method as described in claim 1, wherein the capture hint data describes an action to be performed before the capturing of the digital image.

6. The method as described in claim 5, wherein the capturing is performed in response to detecting performance of the action.

7. The method as described in claim 1, wherein the causing of the output causes at least one other computing device to output the hint.

8. The method as described in claim 1, wherein the capturing is performed is response to receipt of an input from a user input device of the image capture device and the forming, the receiving, and the outputting are performed prior to the receipt of the input.

9. A system comprising:
a request reception module implemented by at least one computing device to receive request formed by an image capture device for the capture hint data, the request describing a characteristic of an image scene that is to be a subject of the digital image;
a hint data location module implemented by the at least one computing device to locate the capture hint data based on the characteristic described in the request, the capture hint data is generated through machine learning using a model generated using training data, the training data includes a plurality of digital images and corresponding metadata describing the characteristic of a respective image scene that is captured by each said image; and
a communication generation module implemented by the at least one computing device to generate a communication for transmission via the network that includes the capture hint data that is configured for output by the image capture device to guide how to capture the digital image based on the characteristic described in the request.

10. The system as described in claim 9, wherein the characteristic described by the request is a geographical location of the image capture device and the capture hint data is based at least in part on the geographical location.

11. The system as described in claim 9, wherein the characteristic described by the request is a physical orientation of the image capture device and the capture hint data is based at least in part on the physical orientation.

12. The system as described in claim 11, wherein the physical orientation identifies a direction, toward which, the image capture device is pointed to view the image scene or an orientation of the image capture device in three-dimensional space.

13. An image capture device comprising:
an image sensor to generate an analog signal of an image scene from light captured by at least one lens;
an analog-digital converter to convert the analog signal into raw image data;
a pre-capture system to obtain capture hint data that corresponds to a characteristic of the image scene based at least in part on the raw image data;
an output device to output a hint generated from the capture hint data, the hint indicative of how to capture the digital image of the image scene based on the characteristic;
a user input device configured to initiate an input to initiate generation of a digital image of the image scene; and
a digital image processor to generate the digital image by processing the raw image data in response to receipt of the input that is subsequent to the output of the hint by the display device.

14. The image capture device as described in claim 13, wherein the characteristic is a geographical location or physical orientation of the image capture device and the capture hint data describes another geographical location or physical orientation, at which, to capture the digital image of the image scene by the image capture device.

15. The image capture device as described in claim 13, wherein the characteristic identified an object proximal to the image capture device and the capture hint data describes a composition to be used to capture the digital image of the image scene by the image capture device.

16. The image capture device as described in claim 13, wherein the characteristic described by the request is a geographical location of the image capture device and the capture hint data is based at least in part on the geographical location.

17. The image capture device as described in claim 13, wherein the characteristic described by the request is a physical orientation of the image capture device and the capture hint data is based at least in part on the physical orientation, the physical orientation describing:
a direction, toward which, the image capture device is pointed to view the image scene; or
an orientation of the image capture device in three-dimensional space.

18. The image capture device as described in claim 13, wherein the capture hint data describes an action to be performed before the capturing of the digital image and the capturing is performed in response to detecting performance of the action.

19. The image capture device as described in claim 13, wherein the capture hint data describes a time at which to capture the digital image.

20. The image capture device as described in claim 13, wherein the capture hint data describes a composition of one or more objects to capture the digital image.

* * * * *